United States Patent
Chung et al.

(10) Patent No.: US 12,286,372 B2
(45) Date of Patent: Apr. 29, 2025

(54) METHOD AND APPARATUS FOR TREATING WASTEWATER

(71) Applicant: Samsung E&A Co., Ltd., Seoul (KR)

(72) Inventors: Seung Joon Chung, Suwon (KR); Han Uk Lee, Suwon (KR)

(73) Assignee: SAMSUNG E&A CO., LTD., Seoul (KR)

( * ) Notice: Subject to any disclaimer, the term of this patent is extended or adjusted under 35 U.S.C. 154(b) by 0 days.

(21) Appl. No.: 18/740,954

(22) Filed: Jun. 12, 2024

(65) Prior Publication Data

US 2024/0417300 A1    Dec. 19, 2024

(30) Foreign Application Priority Data

Jun. 19, 2023 (KR) .......................... 10-2023-0078213

(51) Int. Cl.
*C02F 9/00* (2023.01)
*C02F 1/32* (2023.01)
(Continued)

(52) U.S. Cl.
CPC .................. *C02F 9/00* (2013.01); *C02F 1/32* (2013.01); *C02F 1/5245* (2013.01); *C02F 1/56* (2013.01); *C02F 1/66* (2013.01); *C02F 1/725* (2013.01); *C02F 3/12* (2013.01); *C02F 2001/007* (2013.01); *C02F 1/008* (2013.01);
(Continued)

(58) Field of Classification Search
None
See application file for complete search history.

(56) References Cited

U.S. PATENT DOCUMENTS

| 6,251,264 B1 * | 6/2001 | Tanaka | C02F 1/725 210/195.3 |
| 2021/0206679 A1 | 7/2021 | Chung et al. | |

FOREIGN PATENT DOCUMENTS

| CN | 112939352 A * | 6/2021 | ............... C02F 9/00 |
| CN | 114644436 A * | 6/2022 | ............... C02F 9/00 |
| JP | H0975993 A | 3/1997 | |
| JP | 2001334275 A | 12/2001 | |

(Continued)

OTHER PUBLICATIONS

Machine translation of CN-114644436-A, pp. 1-10. (Year: 2022).*
(Continued)

*Primary Examiner* — Clare M Perrin
(74) *Attorney, Agent, or Firm* — Panitch Schwarze Belisario & Nadel LLP

(57) ABSTRACT

Disclosed are a method and apparatus for treating wastewater. The disclosed method for treating wastewater includes a step (S10-1) of passing wastewater through a UV reaction tank to produce first treated water; a step (S10-2) of passing the first treated water through a pH adjustment tank to produce second treated water; a step (S10-3) of passing the second treated water through a first flocculation tank to produce third treated water; a step (S10-4) of passing the third treated water through a second flocculation tank to produce fourth treated water; a step (S10-5) of passing the fourth treated water through an inorganic sedimentation tank to produce fifth treated water and sludge; a step (S10-6) of passing the fifth treated water through a biological treatment reactor to produce sixth treated water; and a step (S10-7) of passing the sixth treated water through an organic sedimentation tank to produce seventh treated water.

8 Claims, 2 Drawing Sheets

(51) Int. Cl.
- *C02F 1/52* (2023.01)
- *C02F 1/56* (2023.01)
- *C02F 1/66* (2023.01)
- *C02F 1/72* (2023.01)
- *C02F 3/12* (2023.01)
- *C02F 1/00* (2023.01)
- *C02F 101/10* (2006.01)
- *C02F 101/14* (2006.01)
- *C02F 101/30* (2006.01)
- *C02F 103/34* (2006.01)

(52) U.S. Cl.
CPC .... *C02F 2101/105* (2013.01); *C02F 2101/14* (2013.01); *C02F 2101/30* (2013.01); *C02F 2103/346* (2013.01); *C02F 2201/326* (2013.01); *C02F 2301/08* (2013.01); *C02F 2305/10* (2013.01)

(56) References Cited

FOREIGN PATENT DOCUMENTS

| | | |
|---|---|---|
| JP | 2004188274 A | 7/2004 |
| JP | 2011206637 A | 10/2011 |
| KR | 20060111969 A | 10/2006 |
| KR | 20190129631 A | 11/2019 |
| KR | 20210088799 A | 7/2021 |
| KR | 20210097438 A | 8/2021 |

OTHER PUBLICATIONS

Machine translation of CN-112939352-A, pp. 1-16. (Year: 2021).*
Notice of Allowance issued by the Korean Intellectual Property Office dated Aug. 30, 2024 in corresponding Korean Application No. 10-2023-0078213 (10 pages).
Notice of Non-Final Rejection, issued Jan. 30, 2024, in Korean Application No. 10-2023-0078213, 5 pages.

* cited by examiner

METHOD AND APPARATUS FOR TREATING WASTEWATER

CROSS-REFERENCE TO RELATED APPLICATION

This application is based on and claims priority under 35 U.S.C. § 119 to Korean Patent Application No. 10-2023-078213, filed on Jun. 19, 2023, in the Korean Intellectual Property Office, the disclosure of which is incorporated by reference herein in its entirety.

BACKGROUND

1. Field

Disclosed are a method and apparatus for treating wastewater. More specifically, disclosed are a method and apparatus for treating wastewater, which can improve the stability of inorganic matter treatment and the nitrification rate during organic matter treatment.

2. Description of the Related Art

In the electronics industry, wastewater including hydrogen peroxide, organic solvents, and inorganic acids (such as hydrofluoric acid) is generated during a wet etching process. To treat wastewater including these components, discharged in the electronics industry, the prior art employed a combined process of a flocculation-and-sedimentation process and a biological reaction process. However, when hydrogen peroxide is removed using a hydrogen peroxide remover, oxygen bubbles are generated, and when excessive oxygen bubbles remain in the wastewater, sludge may float in a sedimentation tank. In addition, since refractory organic matter is present in wastewater, microbial activity is inhibited, and thus the nitrification rate may be inhibited in the biological reaction process.

Meanwhile, it is expected that the strengthened regulation of fluorine concentrations in discharged water will be stipulated in the Act on Integrated Management of Environmental Pollution Facilities and legislated around 2025. Accordingly, there is an increasing need for a highly efficient fluorine removal process which minimizes the injection amount of fluoride remover and minimizes side effects. When an increased amount of fluoride remover is injected, the amount of sludge generated increases, leading to an increase in sludge treatment facility and sludge treatment capacity, and the settling speed of sediment is reduced and thus the site area of a sedimentation pond increases. In addition, since an increased amount of fluoride remover is injected, the concentration of chlorine (Cl) increases, and thus, in order to prevent corrosion due to chlorine, measures for changing the materials of pipes/pumps and minimizing the negative impact on the environment are required.

SUMMARY

One embodiment of the present invention provides a method for treating wastewater, which can improve the stability of inorganic matter treatment and the nitrification rate during organic matter treatment.

Another embodiment of the present invention provides an apparatus for treating wastewater, which can improve the stability of inorganic matter treatment and the nitrification rate during organic matter treatment.

Additional aspects will be set forth in part in the description which follows and, in part, will be apparent from the description, or may be learned by practice of the presented embodiments of the disclosure.

One aspect of the present invention provides a method for treating wastewater, including the steps of:
- (S10-1) passing wastewater through a UV reaction tank to produce first treated water;
- (S10-2) passing the first treated water through a pH adjustment tank to produce second treated water;
- (S10-3) passing the second treated water through a first flocculation tank to produce third treated water;
- (S10-4) passing the third treated water through a second flocculation tank to produce fourth treated water;
- (S10-5) passing the fourth treated water through an inorganic sedimentation tank to produce fifth treated water and sludge;
- (S10-6) passing the fifth treated water through a biological treatment reactor to produce sixth treated water; and
- (S10-7) passing the sixth treated water through an organic sedimentation tank to produce seventh treated water.

In the step (S10-1), the UV irradiation intensity of the UV reaction tank may adjusted according to at least one of a concentration of hydrogen peroxide in the wastewater, a concentration of refractory organic matter in the wastewater, and a concentration of refractory organic matter in the treated water discharged from the inorganic sedimentation tank.

A first chemical may be added to the pH adjustment tank, the first chemical and a second chemical may be added to the first flocculation tank, and a third chemical may be added to the second flocculation tank.

The first chemical may include slaked lime, the second chemical may include a fluorine remover, and the third chemical may include a polymer coagulant.

The fluorine remover may include aluminum chloride ($AlCl_3$), sodium aluminate ($NaAlO_2$), or a combination thereof, and the polymer coagulant may include anionic polyacrylamide, sodium alginate, sodium polyacrylate, maleate copolymer, partial hydrolysate of polyacrylamide, or a combination thereof.

The pH of the UV reaction tank may be 2.0 to 3.0.

The pH of the pH adjustment tank may be adjusted to be in a range of 3.5 to 6.0.

The concentration of the second chemical in the first flocculation tank may be adjusted to 800 to 1,700 ppm.

The pH of the first flocculation tank may be adjusted to be in a range of 6.5±0.5.

The concentration of the third chemical in the second flocculation tank may be adjusted to be in a range of 3.0±1.0 ppm.

Another aspect of the present invention provides an apparatus for treating wastewater, including:
- a UV reaction tank configured to irradiate wastewater with UV rays to produce first treated water;
- a pH adjustment tank configured to adjust the pH of the first treated water to produce second treated water;
- a first flocculation tank configured to partially flocculate the second treated water to produce third treated water;
- a second flocculation tank configured to additionally partially flocculate the third treated water to produce fourth treated water;
- an inorganic sedimentation tank configured to partially sediment the fourth treated water to produce fifth treated water and sludge;

a biological treatment reactor configured to additionally biologically treat the fifth treated water to produce sixth treated water; and an organic sedimentation tank configured to partially sediment the sixth treated water to produce seventh treated water and sludge.

The pH adjustment tank may be configured to be operated in a pH range of 3.5 to 6.0.

The first flocculation tank may be configured to be operated at a fluorine remover concentration range of 800 to 1,700 ppm.

The first flocculation tank may be configured to be operated in a pH range of 6.5±0.5.

The second flocculation tank may be configured to be operated in a polymer coagulant concentration range of 3.0±1.0 ppm.

The wastewater treatment apparatus may further includes a UV lamp, a first sensor, a second sensor, a rectifier, a photocatalyst, or a combination thereof, the UV lamp may be configured to irradiate UV to the UV reaction tank, the first sensor may be configured to measure the concentration of hydrogen peroxide in the wastewater, the second sensor may be configured to measure at least one of a concentration of refractory organic matter in the wastewater and a concentration of refractory organic matter in the treated water discharged from the inorganic sedimentation tank, the rectifier may be configured to adjust the UV irradiation intensity of the UV lamp according to a signal from at least one of the first sensor and the second sensor, and the photocatalyst may be configured to promote decomposition of refractory organic matter in the wastewater during UV irradiation.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
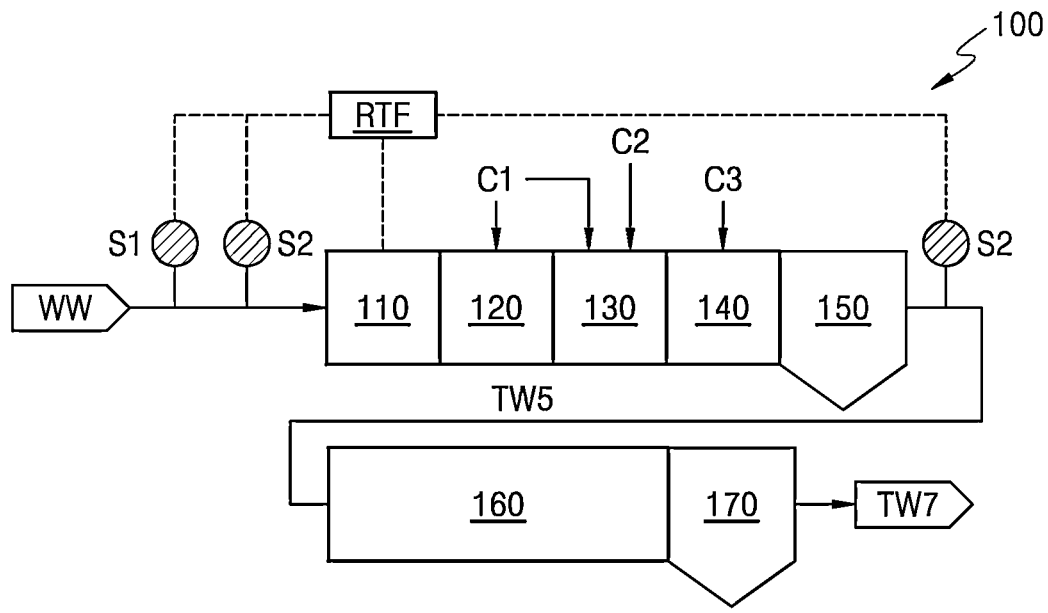
FIG. 1 is a diagram schematically showing a wastewater treatment method and apparatus, according to an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, a method for treating wastewater according to an embodiment of the present invention will be described in detail.

As used herein, "wastewater" means untreated wastewater (i.e., raw water or inflow water).

In addition, as used herein, "UV (ultraviolet)" means electromagnetic waves in the wavelength range of 100 nm to 400 nm.

In addition, as used herein, "treated water" means treated wastewater at any stage from which impurities have been removed from untreated wastewater so that less impurities are contained than the untreated wastewater.

In addition, as used herein, "water to be treated" means water that is subject to treatment at a certain stage, and the to-be-treated water at each stage has a different treatment rate.

In addition, as used herein, the unit "ppm (parts per million)" means mg/L (milligram per liter).

In addition, as used herein, "front end or front end portion" refers to a part or end portion that is located in the relatively reverse direction of the wastewater flow direction, and "rear end or rear end portion" refers to a part or end portion that is located in the relatively forward direction of the wastewater flow direction.

The wastewater treatment method and apparatus according to an embodiment of the present invention may remove hydrogen peroxide, refractory organic matter, fluorine, phosphorus, suspended solids (SS), total nitrogen (T-N), biochemical oxygen demand (BOD), particulate matter and ionic substances in wastewater.

The wastewater treatment method according to an embodiment of the present invention may include the steps of: (S10-1) passing wastewater through a UV reaction tank to produce first treated water; (S10-2) passing the first treated water through a pH adjustment tank to produce second treated water; (S10-3) passing the second treated water through a first flocculation tank to produce third treated water; (S10-4) passing the third treated water through a second flocculation tank to produce fourth treated water; (S10-5) passing the fourth treated water through an inorganic sedimentation tank to produce fifth treated water and sludge; (S10-6) passing the fifth treated water through a biological treatment reactor to produce sixth treated water; and (S10-7) passing the sixth treated water through an organic sedimentation tank to produce seventh treated water.

In the step (S10-1), hydrogen peroxide in the wastewater is decomposed by UV irradiation to produce OH radicals, refractory organic matter in the wastewater is removed using the produced OH radicals, and concerns about sludge flotation caused due to oxygen bubbles produced when hydrogen peroxide is decomposed using a hydrogen peroxide remover, as in the prior art, can be resolved.

In addition, in the step (S10-1), the risk of occurrence of scale can be reduced due to operating at low pH and not adding of slaked lime.

In addition, in the step (S10-1), the UV irradiation intensity of the UV reaction tank may be adjusted according to at least one of a concentration of hydrogen peroxide in the wastewater, a concentration of refractory organic matter in the wastewater, and a concentration of refractory organic matter in the treated water discharged from the inorganic sedimentation tank.

The pH of the UV reaction tank may be 2.0 to 3.0. The pH of the UV reaction tank may be determined by the pH of the wastewater.

In the step (S10-2), more than 95% of fluorine may be removed, and less than 50% of phosphorus in wastewater may be removed.

A first chemical may be added to the pH adjustment tank. The first chemical may include slaked lime.

The pH of the pH adjustment tank may be adjusted to be in a range of 3.5 to 6.0. When the pH of the pH adjustment tank is within the range stated above, high-quality treated water with low fluorine concentration, phosphorus concentration, chlorine ion concentration, organic matter concentration, total nitrogen (T-N), and BOD can be obtained, as well as the amount of sludge produced can be reduced.

The steps (S10-3) and (S10-4) serve to additionally remove 3% or more of fluorine (cumulatively remove 98% or more), additionally remove 45% or more of phosphorus (cumulatively remove 95% or more) in the to-be-treated water, and minimize the amount of chemical input and the amount of sludge produced.

The first chemical and a second chemical may be added to the first flocculation tank.

The concentration of the second chemical in the first flocculation tank may be adjusted to be in a range of 800 to 1,700 ppm. When the concentration of the second chemical in the first flocculation tank is within the range stated above, high-quality treated water with low fluorine concentration, phosphorus concentration, chlorine ion concentration, organic matter concentration, total nitrogen (T-N), and BOD can be obtained, as well as the amount of sludge produced can be reduced.

The pH of the first flocculation tank may be adjusted to be in a range of 6.0±0.5. When the pH of the first flocculation tank is within the range stated above, high-quality treated water with low fluorine concentration, phosphorus concentration, chlorine ion concentration, organic matter concentration, total nitrogen (T-N), and BOD can be obtained, as well as the amount of sludge generated can be reduced.

The second chemical may include a fluorine remover.

The fluorine remover may include aluminum chloride ($AlCl_3$), sodium aluminate ($NaAlO_2$), or a combination thereof.

The third chemical may be added to the second flocculation tank.

The concentration of the third chemical in the second flocculation tank may be adjusted to be in a range of 3.0±1.0 ppm. When the concentration of the third chemical in the second flocculation tank is within the range stated above, high-quality treated water with low fluorine concentration, phosphorus concentration, chlorine ion concentration, organic matter concentration, total nitrogen (T-N), and BOD can be obtained, as well as the amount of sludge produced can be reduced.

The third chemical may include a polymer coagulant.

The polymer coagulant may include anionic polyacrylamide, sodium alginate, sodium polyacrylate, maleate copolymer, partial hydrolysate of polyacrylamide, or a combination thereof.

The step (S10-5) serves to treat organic matter in the to-be-treated water and allow solid-liquid separation to occur.

The step (S10-6) serves to remove total nitrogen (T-N) and BOD from the to-be-treated water using microorganisms.

The biological treatment reactor may be a reactor that implements an activated sludge process, which is a biological wastewater treatment process, or a reactor that implements a process that combines a separation membrane process such as microfiltration or ultrafiltration with an activated sludge process.

In addition, in the biological treatment reactor of the step (S10-6), a denitrification reaction as shown in reaction formula 1 below may occur by denitrifying microorganisms.

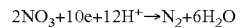

$$2NO_3 + 10e + 12H^+ \rightarrow N_2 + 6H_2O \qquad \text{[Reaction formula 1]}$$

The denitrifying microorganisms may include *Pseudomonas, Bacillus, Spirillum, Hyphomicrobium, Agrobacterium, Acinetobacter, Propionibacterium, Rhizobium, Corynebacterium, Cytophaga, Thiobacillus, Alcaligenes, Pseudomonas fluorescens, P. Aeruginosa, P. denitrificans, Alcaligenes* sp., *Curvibacter delicatus, Acidovorax defluvii, Dokdonella koreensis, Dokdonella koreensis, Flavobacterium limicola, Terrimonas ferruginea, Terrimonas lutea*, or combinations thereof.

Hereinafter, a wastewater treatment apparatus according to an embodiment of the present invention will be described in detail with reference to FIGS. 1 and 2. FIG. 1 is a diagram schematically showing a wastewater treatment method and apparatus 100 according to an embodiment of the present invention, and FIG. 2 is a diagram showing a photolysis unit installed in the wastewater treatment apparatus of FIG. 1.

Referring to FIG. 1, the wastewater treatment apparatus 100 according to an embodiment of the present invention may include a UV reaction tank 110, a pH adjustment tank 120, a first flocculation tank 130, a second flocculation tank 140, an inorganic sedimentation tank 150, a biological treatment reactor 160, and an organic sedimentation tank 170.

The UV reaction tank 110 may be configured to produce first treated water by irradiating UV to wastewater (WW).

Figure 2:
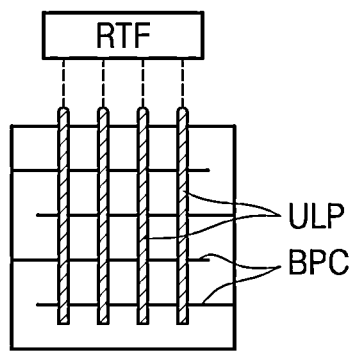
FIG. 2 is a diagram showing a photolysis unit installed in the wastewater treatment apparatus of FIG. 1.

In addition, referring to FIG. 2 together with FIG. 1, the wastewater treatment apparatus 100 may further include a photolysis unit such as a UV lamp (ULP), a first sensor S1, a second sensor S2, a rectifier (RTF), a photocatalyst (BPC), or a combination thereof.

The UV lamp (ULP) may be configured to irradiate UV to the UV reaction tank 110.

The first sensor (S1) may be configured to measure the concentration of hydrogen peroxide in the wastewater (WW).

The second sensor (S2) may be configured to measure at least one of the concentration of refractory organic matter in the wastewater (WW) and the concentration of refractory organic matter in the treated water (TW5) discharged from the inorganic sedimentation tank 150.

The rectifier (RTF) may be configured to adjust the UV irradiation intensity of the UV lamp (ULP) according to a signal from at least one of the first sensor (S1) and the second sensor (S2).

The photocatalyst (BPC) may be configured to promote the decomposition of refractory organic matter in wastewater (WW) during UV irradiation. For example, the photocatalyst (BPC) may be used when hydrogen peroxide is not present or is present in a negligibly small amount in wastewater (WW). The photocatalyst (BPC) may be manufactured in the form of a baffle.

A first chemical C1 may be added to the pH adjustment tank 120. The pH adjustment tank 120 may be configured to be operated in a pH range of 3.5 to 6.0. When the pH adjustment tank 120 is configured to be operated in the pH range stated above, high-quality treated water with low fluorine concentration, phosphorus concentration, chlorine ion concentration, organic matter concentration, total nitrogen (T-N), and BOD can be obtained, as well as the amount of sludge produced can be reduced.

The first chemical C1 and a second chemical C2 may be added to the first flocculation tank 130. The first flocculation tank 130 may be configured to be operated in a fluorine remover concentration range of 800 to 1,700 ppm. When the first flocculation tank 130 is configured to be operated in the fluorine remover concentration range stated above, high-quality treated water with low fluorine concentration, phosphorus concentration, chlorine ion concentration, organic matter concentration, total nitrogen (T-N), and BOD can be obtained, as well as the amount of sludge generated can be reduced.

In addition, the first flocculation tank 130 may be configured to be operated in a pH range of 6.5±0.5. When the first flocculation tank 130 is configured to be operated in the pH range stated above, high-quality treated water with low fluorine concentration, phosphorus concentration, chlorine ion concentration, organic matter concentration, total nitrogen (T-N), and BOD can be obtained, as well as the amount of sludge generated can be reduced.

The third chemical C3 may be added to the second flocculation tank 140. In addition, the second flocculation tank 140 may be configured to be operated in a pH range of 3.0±1.0. When the second flocculation tank 140 is configured to be operated in the pH range stated above, high-quality treated water with low fluorine concentration, phosphorus concentration, chlorine ion concentration, organic matter concentration, total nitrogen (T-N), and BOD can be obtained, as well as the amount of sludge produced can be reduced.

The wastewater treatment method and apparatus having the above described configuration according to an embodiment of the present invention may provide the effects of reducing the total amount of chemicals used by 75 wt %, reducing the chlorine ion concentration by 28%, increasing the nitrogen removal rate by 25%, saving the site area by 9.7%, and reducing the amount of sludge generated, compared to existing technology.

Hereinafter, the present invention will be described in more detail through examples, but the present invention is not limited to these examples.

Manufacture Example: Manufacture of Apparatus

A wastewater treatment apparatus having a configuration shown in FIG. 1 was manufactured.

The manufactured wastewater treatment apparatus includes a UV reaction tank, a pH adjustment tank, a first flocculation tank, a second flocculation tank, an inorganic sedimentation tank, a biological treatment reactor, and an organic sedimentation tank.

Example 1: Operation of Wastewater Treatment Apparatus

As wastewater, semiconductor step wastewater having pH of 2.5, fluoride ion concentration (F) of 568 ppm, chlorine ion concentration (Cl) of 50 ppm, $PO_4$-P of 200 ppm, organic matter concentration of 400 ppm, total nitrogen (T-N) of 400 ppm, and BOD of 700 ppm was used. Slaked lime is added to the pH adjustment tank, slaked lime and aluminum chloride ($AlCl_3$) are added to the first flocculation tank, and anionic polyacrylamide is added to the second flocculation tank. The content of slaked lime added to the pH adjustment tank is the amount in which the pH (R1-pH) of the pH adjustment tank is made to be maintained at 5.0. The content of aluminum chloride ($AlCl_3$) added to the first flocculation tank is the amount in which the concentration (R3-C2) of aluminum chloride ($AlCl_3$) in the first flocculation tank is made to be 1,200 ppm. The content of slaked lime added to the first flocculation tank is the amount in which the pH (R3-pH) of the first flocculation tank is made to be maintained at 6.5. The content of anionic polyacrylamide added to the second flocculation tank is the amount in which the concentration (R4-C3) of anionic polyacrylamide in the second flocculation tank is made to be 3 ppm.

Example 2: Operation of Wastewater Treatment Apparatus

The wastewater treatment apparatus was operated in the same manner as in Example 1, except that the content of slaked lime added to the first flocculation tank was changed to an amount in which the pH (R2-pH) of the pH adjustment tank was made to be maintained at 3.5.

Example 3: Operation of Wastewater Treatment Apparatus

The wastewater treatment apparatus was operated in the same manner as in Example 1, except that the content of slaked lime added to the first flocculation tank was changed to an amount in which the pH (R2-pH) of the pH adjustment tank was made to be maintained at 6.0.

Example 4: Operation of Wastewater Treatment Apparatus

The wastewater treatment apparatus was operated in the same manner as in Example 1, except that the content of aluminum chloride ($AlCl_3$) added to the first flocculation tank was changed to an amount in which the concentration (R3-C2) of aluminum chloride ($AlCl_3$) in the first flocculation tank was made to be 800 ppm.

Example 5: Operation of Wastewater Treatment Apparatus

The wastewater treatment apparatus was operated in the same manner as in Example 1, except that the content of aluminum chloride ($AlCl_3$) added to the first flocculation tank was changed to an amount in which the concentration (R3-C2) of aluminum chloride ($AlCl_3$) in the first flocculation tank was made to be 1,700 ppm.

Reference Example 1: Operation of Wastewater Treatment Apparatus

The wastewater treatment apparatus was operated in the same manner as in Example 1, except that the content of slaked lime added to the first flocculation tank was changed to an amount in which the pH (R2-pH) of the pH adjustment tank was made to be maintained at 3.0.

Reference Example 2: Operation of Wastewater Treatment Apparatus

The wastewater treatment apparatus was operated in the same manner as in Example 1, except that the content of slaked lime added to the first flocculation tank was changed to an amount in which the pH (R2-pH) of the pH adjustment tank was made to be maintained at 6.5.

Reference Example 3: Operation of Wastewater Treatment Apparatus

The wastewater treatment apparatus was operated in the same manner as in Example 1, except that the content of aluminum chloride (AlCl$_3$) added to the first flocculation tank was changed to an amount in which the concentration (R3-C2) of aluminum chloride (AlCl$_3$) in the first flocculation tank was made to be 700 ppm.

Reference Example 4: Operation of Wastewater Treatment Apparatus

The wastewater treatment apparatus was operated in the same manner as in Example 1, except that the content of aluminum chloride (AlCl$_3$) added to the first flocculation tank was changed to an amount in which the concentration (R3-C2) of aluminum chloride (AlCl$_3$) in the first flocculation tank was made to be 1,800 ppm.

Comparative Example 1: Operation of Wastewater Treatment Apparatus

The wastewater treatment apparatus was operated in the same manner as in Example 1, except that the UV reaction tank was replaced with a hydrogen peroxide removal tank, and the content of the hydrogen peroxide remover (catalase) added to the hydrogen peroxide removal tank was changed to an amount such that the concentration of the hydrogen peroxide remover (catalase) in the hydrogen peroxide removal tank was made to be 500 ppm.

Comparative Example 2: Operation of Wastewater Treatment Apparatus

The wastewater treatment apparatus was operated in the same manner as in Example 2, except that the UV reaction tank was replaced with a hydrogen peroxide removal tank, and the content of a hydrogen peroxide remover (catalase) added to the hydrogen peroxide removal tank was changed to an amount in which the concentration of the hydrogen peroxide remover (catalase) in the hydrogen peroxide removal tank was made to be 500 ppm.

Comparative Example 3: Operation of Wastewater Treatment Apparatus

The wastewater treatment apparatus was operated in the same manner as in Example 3, except that the UV reaction tank was replaced with a hydrogen peroxide removal tank, and the content of a hydrogen peroxide remover (catalase) added to the hydrogen peroxide removal tank was changed to an amount in which the concentration of the hydrogen peroxide remover (catalase) in the hydrogen peroxide removal tank was made to be 500 ppm.

Comparative Example 4: Operation of Wastewater Treatment Apparatus

The wastewater treatment apparatus was operated in the same manner as in Example 4, except that the UV reaction tank was replaced with a hydrogen peroxide removal tank, and the content of a hydrogen peroxide remover (catalase) added to the hydrogen peroxide removal tank was changed to an amount in which the concentration of the hydrogen peroxide remover (catalase) in the hydrogen peroxide removal tank was made to be 500 ppm.

Comparative Example 5: Operation of Wastewater Treatment Apparatus

The wastewater treatment apparatus was operated in the same manner as in Example 5, except that the UV reaction tank was replaced with a hydrogen peroxide removal tank, and the content of a hydrogen peroxide remover (catalase) added to the hydrogen peroxide removal tank was changed to an amount in which the concentration of the hydrogen peroxide remover (catalase) in the hydrogen peroxide removal tank was made to be 500 ppm.

The operating conditions (pH, chemical added amount, and chemical type) of the wastewater treatment apparatuses of Examples 1 to 5, Reference Examples 1 to 4, and Comparative Examples 1 to 5 are summarized and shown in Table 1 below.

TABLE 1

| | Example | | | | | Reference Example | | | |
|---|---|---|---|---|---|---|---|---|---|
| | 1 | 2 | 3 | 4 | 5 | 1 | 2 | 3 | 4 |
| R2-pH | 5.0 | 3.5 | 6.0 | 5.0 | 5.0 | 3.0 | 6.5 | 5.0 | 5.0 |
| R3-C2 (ppm) | 1,200 | 1,200 | 1,200 | 800 | 1,700 | 1,200 | 1,200 | 700 | 1,800 |

| | Comparative Example | | | | |
|---|---|---|---|---|---|
| | 1 | 2 | 3 | 4 | 5 |
| R2-pH | 5.0 | 3.5 | 6.0 | 5.0 | 5.0 |
| R3-C2 (ppm) | 1,200 | 1,200 | 1,200 | 800 | 1,700 |

Evaluation Example 1: Measurement of Change in Concentration of Residual Hydrogen Peroxide in Treated Water According to Residence Time During UV Treatment Changes in the concentration of residual hydrogen peroxide in the treated water according to residence time during UV treatment in a UV reaction tank were measured, and the results are graphically shown in FIG. 3. Here, the amount of UV irradiation was 45 W/m$^2$, and only one UV lamp was used.

Figure 3:
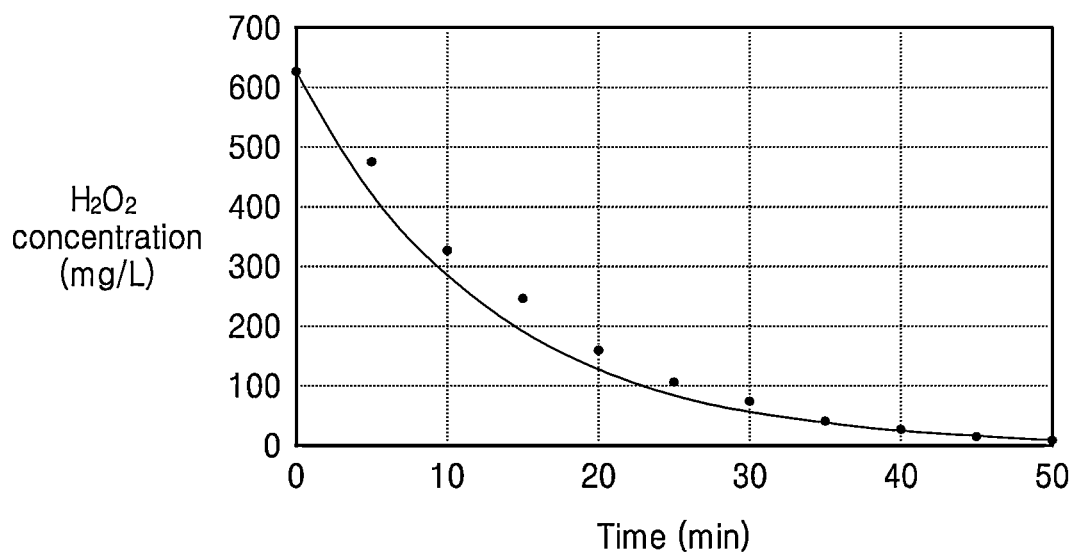
FIG. 3 is a graph showing the change in concentration of residual hydrogen peroxide in treated water according to residence time during UV treatment.

Referring to FIG. 3, when the residence time was 20 minutes, the hydrogen peroxide removal rate was found to be about 73%.

Evaluation Example 2: Removal Rate of Refractory Organic Matter During UV Treatment and Biological Treatment The removal rates of refractory organic matter during UV treatment performed in a UV reaction tank and biological treatment performed in a biological treatment tank were measured by liquid chromatography-organic carbon detector (LC-OCD), and the results are shown in FIG. 4.

Figure 4:
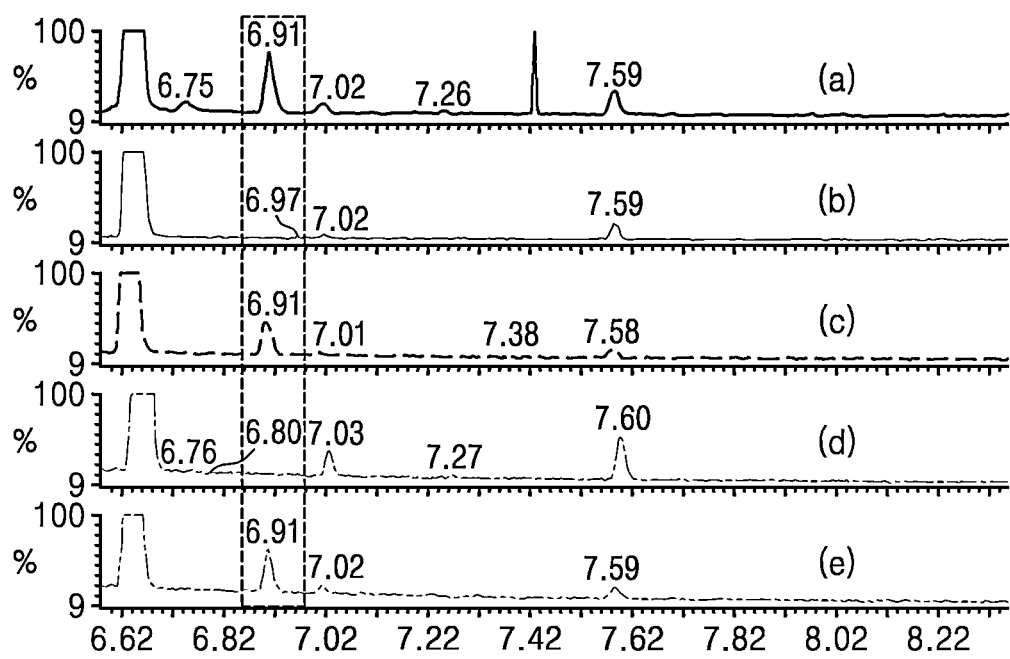
FIG. 4 is a graph showing the rate of removal of refractory organic matter during UV treatment and biological treatment.

In FIG. 4, (a) is the peak of wastewater (i.e., raw water), (b) is the peak of UV treated water on day 1, (c) is the peak of biologically treated water on day 1, (d) is the peak of UV treated water on day 2, and (e) is the peak of biologically treated water on day 2.

Referring to FIG. 4, during biological treatment, almost no refractory organic matter was removed, but during UV treatment, 100% of refractory organic matter that inhibits nitrification was removed when the residence time was 20 minutes.

Evaluation Example 3: Performance Evaluation of Wastewater Treatment Apparatuses The water quality of the final treated water (that is, treated water discharged from the organic sedimentation tank) according to the operation of each of the wastewater treatment apparatuses in Examples 1 to 5, Reference Examples 1 to 4, and Comparative Examples 1 to 5 was evaluated, and the results are shown in Table 2 below. In Table 2, "SS" is an abbreviation for "suspended solid" and "NM" is an abbreviation for "not measured."

TABLE 2

|  | F (ppm) | Cl (ppm) | $PO_4$—P (ppm) | SS (ppm) | Total Organic Carbon (TOC) (ppm) | Total Nitrogen (T-N) (ppm) | BOD (ppm) |
| --- | --- | --- | --- | --- | --- | --- | --- |
| Wastewater | 568 | 50 | 200 | — | 400 | 400 | 700 |
| Example 1 | 10.8 | 340 | 2.3 | 8.5 | 4.3 | 32.9 | 0.5 |
| Example 2 | 12.5 | 350 | 2.6 | 11.5 | 3.3 | 33.8 | 0.4 |
| Example 3 | 10.1 | 330 | 2.5 | 10.0 | 3.9 | 33.5 | 0.4 |
| Example 4 | 10.9 | 320 | 2.8 | 9.6 | 4.1 | 31.6 | 0.4 |
| Example 5 | 9.9 | 490 | 2.5 | 10.2 | 3.3 | 32.5 | 0.4 |
| Reference Example 1 | 18.2 | 410 | 2.9 | 22.0 | 5.7 | 38.0 | NM |
| Reference Example 2 | 16.8 | 410 | 2.9 | 20.4 | 4.9 | 36.0 | NM |
| Reference Example 3 | 18.4 | 230 | 7.6 | 18.2 | 5.0 | 35.2 | NM |
| Reference Example 4 | 16.2 | 530 | 2.5 | 20.2 | 5.1 | 34.5 | NM |
| Comparative Example 1 | 15.5 | 660 | 2.2 | 34.4 | 6.1 | 45.8 | NM |
| Comparative Example 2 | 15.2 | 660 | 2.9 | 39.0 | 5.2 | 47.0 | NM |
| Comparative Example 3 | 17.0 | 660 | 2.5 | 41.5 | 5.7 | 45.5 | NM |
| Comparative Example 4 | 17.5 | 540 | 4.8 | 37.6 | 5.8 | 46.2 | NM |
| Comparative Example 5 | 16.3 | 860 | 2.7 | 42.0 | 5.6 | 44.0 | NM |

Referring to Table 2, the wastewater treatment apparatuses of Examples 1 to 5 were found to produce final treated water having superior quality compared to the wastewater treatment apparatuses of Reference Examples 1 to 4 and Comparative Examples 1 to 5.

According to the wastewater treatment method and apparatus according to one embodiment of the present invention, the stability of inorganic wastewater treatment facilities and organic wastewater treatment facilities can be improved, high-speed processing for saving space (the nitrification speed is improved by up to 25%) can be achieved, and operating costs can be minimized by only operating the appropriate level necessary to remove hydrogen peroxide and refractory organic substances using an automatic control system.

While the present invention has been described with reference to the figures and embodiments, which have been presented by way of example only, and it will be appreciated by those skilled in the art that various changes and other equivalent embodiments may be made from the above description. Therefore, the true technical protection scope of the present invention should be defined by the inventive concept of the appended claims.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method for treating wastewater configured to remove hydrogen peroxide, refractory organic matter, fluorine, phosphorus, suspended solids (SS), total nitrogen (T-N), biochemical oxygen demand (BOD), particulate matter and ionic substances in wastewater, the method comprising:

a step (S10-1) of passing the wastewater through a UV reaction tank to produce first treated water;

a step (S10-2) of passing the first treated water through a pH adjustment tank to produce second treated water;

a step (S10-3) of passing the second treated water through a first flocculation tank to produce third treated water;

a step (S10-4) of passing the third treated water through a second flocculation tank to produce fourth treated water;

a step (S10-5) of passing the fourth treated water through an inorganic sedimentation tank to produce fifth treated water and sludge;

a step (S10-6) of passing the fifth treated water through a biological treatment reactor to produce sixth treated water; and a step (S10-7) of passing the sixth treated water through an organic sedimentation tank to produce seventh treated water, wherein, in the step (S10-1), a UV irradiation intensity of the UV reaction tank is adjusted according to a hydrogen peroxide concentration of the wastewater, a refractory organic matter concentration of the wastewater, and a refractory organic matter concentration of the fifth treated water discharged from the inorganic sedimentation tank, wherein the UV reaction tank comprises a photocatalyst configured to promote decomposition of refractory organic matter in the wastewater during UV irradiation, wherein a first chemical is added to the pH adjustment tank, the first chemical and a second chemical are added to the first flocculation tank, and a third chemical is added to the second flocculation tank, wherein the first chemical includes slaked lime, the second chemical includes a fluorine remover, and the third chemical includes a polymer coagulant, wherein a pH of the pH adjustment tank is adjusted to be in a range of about 3.5 to about 6.0, wherein a concentration of the second chemical in the first flocculation tank is adjusted to about 800 to about 1,700 ppm.

2. The method of claim 1, wherein the fluorine remover includes aluminum chloride ($AlCl_3$), sodium aluminate ($NaAlO_2$), or a combination thereof, and the polymer coagulant includes anionic polyacrylamide, sodium alginate, sodium polyacrylate, maleate copolymer, a partial hydrolysate of polyacrylamide, or a combination thereof.

3. The method of claim 1, wherein a pH of the UV reaction tank is about 2.0 to about 3.0.

4. The method of claim 1, wherein a pH of the first flocculation tank is adjusted to be in a range of about 6.5±0.5.

5. The method of claim 4, wherein a concentration of the third chemical in the second flocculation tank is adjusted to be in a range of about 3.0±1.0 ppm.

6. An apparatus for treating wastewater configured to remove hydrogen peroxide, refractory organic matter, fluorine, phosphorus, suspended solids (SS), total nitrogen (T-N), biochemical oxygen demand (BOD), particulate matter and ionic substances in wastewater, the apparatus comprising:

a UV reaction tank configured to irradiate wastewater with UV rays to produce first treated water;

a pH adjustment tank configured to adjust the pH of the first treated water to produce second treated water;

a first flocculation tank configured to partially flocculate the second treated water to produce third treated water;

a second flocculation tank configured to additionally partially flocculate the third treated water to produce fourth treated water;

an inorganic sedimentation tank configured to partially sediment the fourth treated water to produce fifth treated water and sludge;

a biological treatment reactor configured to additionally biologically treat the fifth treated water to produce sixth treated water; and an organic sedimentation tank configured to partially sediment the sixth treated water to produce seventh treated water and sludge, the UV reaction tank includes the photocatalyst configured to promote decomposition of refractory organic matter in the wastewater during UV irradiation, wherein the pH adjustment tank is configured to be operated in a pH range of about 3.5 to about 6.0, wherein the first flocculation tank is configured to be operated in a fluorine remover concentration range of about 800 to about 1,700 ppm, wherein the apparatus further comprises a UV lamp, a first sensor, a second sensor, a rectifier and a photocatalyst, wherein the UV lamp is configured to irradiate UV to the UV reaction tank, the first sensor is configured to measure a concentration of hydrogen peroxide in the wastewater, the second sensor is configured to measure at least one of a concentration of refractory organic matter in the wastewater and a concentration of refractory organic matter in the fifth treated water discharged from the inorganic sedimentation tank, the rectifier is configured to adjust an intensity of UV irradiation from the UV lamp according to a signal from at least one of the first sensor and the second sensor, and the photocatalyst is configured to promote decomposition of refractory organic matter in the wastewater during UV irradiation.

7. The apparatus of claim 6, wherein the first flocculation tank is configured to be operated in a pH range of about 6.5±0.5.

8. The apparatus of claim 7, wherein the second flocculation tank is configured to be operated in a polymer coagulant concentration range of about 3.0±1.0 ppm.

* * * * *